United States Patent
Mielenz

(10) Patent No.: US 11,279,347 B2
(45) Date of Patent: Mar. 22, 2022

(54) EMERGENCY STOP POINT OF A MOTOR VEHICLE

(71) Applicant: Robert Bosch GmbH, Stuttgart (DE)

(72) Inventor: Holger Mielenz, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 285 days.

(21) Appl. No.: 16/465,307

(22) PCT Filed: Oct. 19, 2017

(86) PCT No.: PCT/EP2017/076708
§ 371 (c)(1),
(2) Date: May 30, 2019

(87) PCT Pub. No.: WO2018/103937
PCT Pub. Date: Jun. 14, 2018

(65) Prior Publication Data
US 2019/0389457 A1    Dec. 26, 2019

(30) Foreign Application Priority Data

Dec. 5, 2016  (DE) .......................... 102016224157.5

(51) Int. Cl.
*B60W 30/09*     (2012.01)
*B60W 50/00*     (2006.01)

(52) U.S. Cl.
CPC ........ *B60W 30/09* (2013.01); *B60W 50/0097* (2013.01); *B60W 2520/10* (2013.01)

(58) Field of Classification Search
CPC ............ B60W 30/09; B60W 50/0097; B60W 2520/10
See application file for complete search history.

(56) References Cited

U.S. PATENT DOCUMENTS

2013/0018549 A1   1/2013  Kobana et al.
2018/0052463 A1*  2/2018  Mays ................... B60W 50/02

FOREIGN PATENT DOCUMENTS

| DE | 102012008090 A1 | 10/2013 |
| DE | 102014213171 A1 | 10/2015 |
| EP | 2390862 A2 | 11/2011 |
| JP | 2015228089 A | 12/2015 |
| JP | 2015228090 A | 12/2015 |
| JP | 2016530596 A | 9/2016 |

OTHER PUBLICATIONS

International Search Report for PCT/EP2017/076708, dated Feb. 26, 2018.

* cited by examiner

*Primary Examiner* — Michael D Lang
(74) *Attorney, Agent, or Firm* — Norton Rose Fulbright US LLP; Gerard Messina

(57) ABSTRACT

A method for determining an emergency stop point for a motor vehicle includes steps of determining a driving state of the motor vehicle and determining an emergency stop point in the area of the motor vehicle on the basis of the driving state. The stop point is determined in such a way that a risk of stopping at the determined emergency stop point does not exceed a predetermined value.

10 Claims, 3 Drawing Sheets

EMERGENCY STOP POINT OF A MOTOR VEHICLE

FIELD OF THE INVENTION

The present invention relates to the determination of an emergency stop point of a motor vehicle. In particular, the present invention relates to the determination of an emergency stop point for a motor vehicle having highly automated or fully automated driving functionality.

BACKGROUND INFORMATION

A motor vehicle is set up to be driven on a roadway traffic network. The motor vehicle can be partly or completely automated by a driving function, so that a driver of the motor vehicle can be relieved of the task of longitudinal or transverse control of the motor vehicle. The higher the degree of automation of the driving function, the less the driver is involved in the driving of the motor vehicle. At the highest degree of automation, the motor vehicle can drive autonomously, in which case the driver standardly no longer monitors the driving function and, at least within a predetermined time window, is not available even as a fallback measure.

If the motor vehicle experiences a defect, for example due to wear, an accident, or a processing error in particular of the automated driving function, it may be appropriate to bring the motor vehicle to a halt as quickly as possible. However, additional dangers may be associated with the stopping of the motor vehicle. In the first place, the motor vehicle may itself be exposed to a higher risk of damage due to the stopping process, and in the second place other traffic participants may be disturbed, hindered, or endangered by the stopped motor vehicle.

SUMMARY OF THE INVENTION

An object of the present invention is to indicate an improved technique for stopping a motor vehicle. The present invention achieves this task through the subject matter of the independent claims. Specific embodiments are indicated and described herein.

A method for determining an emergency stop point of a motor vehicle includes steps of determining a driving state of the motor vehicle and determining an emergency stop point in the area of the motor vehicle on the basis of the driving state. The emergency stop point is determined in such a way that a risk of stopping at the determined emergency stop point does not exceed a predetermined value.

The emergency stop point is a location at which the motor vehicle can be stopped. For this purpose, any standard stop point may be used that can be used for example for stopping the motor vehicle in conformance with traffic regulations during normal operation, such as a stopping bay, an entrance, or a parking lot. However, if the stopping is motivated by an emergency state on board the motor vehicle, such as a technical defect or a health problem with a passenger, then locations for stopping may also be used at which stopping is not permitted or is not favorable. The stopping of the motor vehicle may in such a case be found to be more important than possible negative effects on other drivers.

Advantageously, through the described selection of the emergency stop point, a risk that could arise due to the stopping of the motor vehicle can be kept below the predetermined value. In this way, resulting damage to the motor vehicle or to another traffic participant due to the stopping of the motor vehicle can be reduced or avoided. By minimizing the risk of stopping, a flow of traffic in the area of the emergency stop point can be disturbed only to a small extent or not at all.

In a specific embodiment, the value is determined as a function of the driving state. In particular, on the basis of the driving state it can be determined which points in the environment surrounding the motor vehicle can be reached safely.

The driving state can include for example the speed of the motor vehicle. If a potential emergency stop point is close to the motor vehicle, then stopping at this point may be associated with a significant deceleration that can present a risk. If on the other hand the motor vehicle is traveling relatively slowly, then an equally strong deceleration, which then however does not last as long, may in some circumstances be acceptable. A maximum tolerable deceleration or acceleration of the motor vehicle in the longitudinal or transverse direction can be determined as a function of the current environmental conditions, such as the grip of the road surface.

In a further specific embodiment, the driving state includes the urgency of the stop. If for example two potential emergency stop points are identified, of which one is relatively close but has a relatively high stopping risk, while the other is further away but has a lower stopping risk, then the closer stop point can be selected as the emergency stop point if the urgency of the stop is so high that it is not guaranteed that the more distant stop point can be safely reached. The urgency of the stopping can be a function for example of a technical state of the motor vehicle. For example, if a drive mechanism of the motor vehicle has failed, it can for example be determined relatively precisely how far the motor vehicle can still roll before it will come to a standstill anyway. The degree of urgency then necessarily describes a stop point within the maximum roll path. It may be more advantageous to brake the motor vehicle earlier rather than letting it roll out, in order to minimize the risk of stopping at the emergency stop point. If, in another example, a defect is present only in the external lighting of the motor vehicle, and dusk has begun to fall, then the urgency of stopping the motor vehicle may be relatively low, because the motor vehicle can still safely be driven for several minutes without external lighting.

The risk of stopping at the emergency stop point can include a risk of additional damage to the motor vehicle or one of its occupants. If for example emergency stop point can be found that is less risky than one that can be reached by driving on a soft shoulder or embankment of a previously driven street, then additional damage to the motor vehicle may occur due to the stopping process or the sojourn of the motor vehicle at the emergency stop point. Emergency stop points that are risky in this sense can include for example soft terrain, standing or flowing bodies of water, or another traffic route.

In another specific embodiment, the risk of stopping at the emergency stop point includes a risk of damage to another traffic participant. For example, if the motor vehicle stops on a one-lane stretch, then oncoming or following traffic may not timely recognize the motor vehicle, which has become an obstacle, and could collide with it. This can hold in particular if visibility is poor or the roadway surface is slippery.

The risk of stopping at the emergency stop point can be determined on the basis of environmental data about the emergency stop point, from map data. For example, the position of the motor vehicle can be determined, for example using satellite navigation, and a number of emergency stop points can then be determined on the basis of map data in the area of the determined position. If for example a potential emergency stop point is at a location at which the stopped motor vehicle could not be perceived by following or oncoming traffic from an adequate distance, the stopping risk for this emergency stop point can be increased. The risk of stopping can also be determined as increased if other traffic participants cannot pass the motor vehicle stopped at the potential emergency stop point without reducing their speed or having to go around the vehicle. If the potential emergency stop point is in the area of a traffic node, for example an intersection, a railway crossing, or a pedestrian crossing (zebra stripes), then the stopping risk can be increased if crossing traffic could be hindered or endangered.

In another specific embodiment, environmental data of the emergency stop point are scanned, and the risk of stopping at the emergency stop point is determined on the basis of the scanned environmental data. In this way, in particular dynamic conditions that could have an influence on the risk of stopping at the emergency stop point can be determined. The environmental data can for example include impaired visibility due to construction at the edge of the roadway, parked vehicles, or vegetation. Traffic participants, in particular pedestrians or bicyclists, present in the area of the emergency stop point or between the motor vehicle and the emergency stop point can also be detected by the scanning. The detected risk factors can be included in the determination of the risk of stopping at the emergency stop point.

The risk of stopping at the emergency stop point can include a risk of additional damage to the motor vehicle, one of its occupants, or some other traffic participant during the stopping process. The stopping risk can therefore also be determined in particular on the basis of a scanning of a surrounding environment of the motor vehicle. If for example another motor vehicle is following closely, then a strong deceleration of the motor vehicle can increase the risk of collision with the following motor vehicle. If it can be assumed that a following motor vehicle is maintaining an adequate safety distance, for example about 70 m at a driving speed of about 50 km/h, then normal deceleration can be accepted. In other circumstances, even a strong deceleration can be accepted, for example if no motor vehicle is following and no more acceptable stop point at a further distance away is available. The stopping risk can also be determined on the basis of environmental data that relate to the area between the motor vehicle and the emergency stop point.

A device for determining an emergency stop point of a motor vehicle includes a determining device that is set up to determine a driving state of the motor vehicle, and a processing device that is set up to determine an emergency stop point in the area of the motor vehicle on the basis of the driving state. The processing device is set up to determine the emergency stop point in such a way that a risk of stopping at the determined emergency stop point does not exceed a predetermined value.

The processing device can in particular include a programmable microcomputer or microcontroller. This can be set up to carry out at least a part of the method described above. Features or advantages of the method therefore also relate to the device, and vice versa.

In another specific embodiment, the processing device can in addition be set up to control a stopping of the motor vehicle at the determined emergency stop point. For this purpose, the processing device can be set up to engage in a longitudinal or transverse controlling of the motor vehicle.

The present invention is described in more detail with reference to the accompanying Figures.

DETAILED DESCRIPTION

Figure 1:
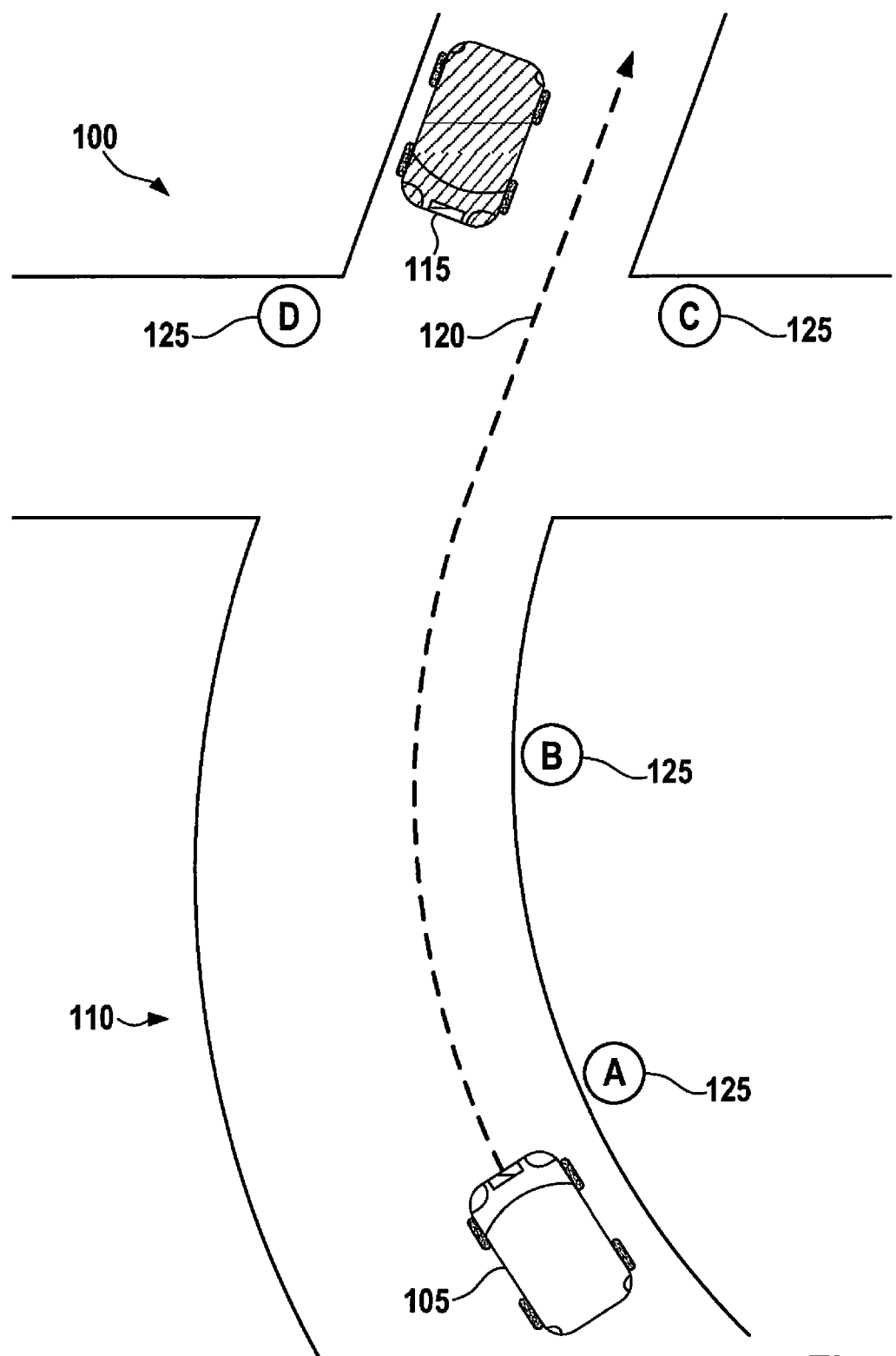
FIG. 1 shows a system with a motor vehicle on a roadway traffic network.

FIG. 1 shows a system 100 with a motor vehicle 105 on an example of a roadway network 110. Motor vehicle 105 may have a highly or fully automated driving function (HAF) in order to control the movement of motor vehicle 105 on roadway network 110 at least partly without driver support.

In FIG. 1, another traffic participant 115 is shown as an example as an oncoming motor vehicle. Other traffic participants 115 may however also include a train, a truck, a bicyclist, a pedestrian, or any other traffic participant. It is to be noted that the other traffic participant 115 may be coming towards, traveling in front of, or following motor vehicle 105, and in addition may also cross a planned trajectory 120 of motor vehicle 105, or may for example be limited by this trajectory.

Due for example to a processing error or damage to an element of motor vehicle 105, it can be appropriate to bring motor vehicle 105 to a standstill, in particular using the automated driving function. For this purpose, motor vehicle 105 can drive to an emergency stop point 125, of which several are shown in FIG. 1 as examples, identified by capital letters A through D.

A risk of additional damage may be associated both with driving to an emergency stop point 125 and with the sojourn at emergency stop point 125. This damage may be to motor vehicle 105 or to one of its occupants or to another traffic participant 115. The damage may also occur at an object in the area of roadway network 110, either due to the stopping or due to the sojourn at emergency stop point 125. It is therefore proposed to determine an emergency stop point 125 for motor vehicle 105 in such a way that a stopping risk associated with emergency stop point 125 does not, as far as possible, exceed a predetermined value. For this purpose, in particular a plurality of emergency stop points 125 in the area of motor vehicle 105 can be identified whose stopping risks are then compared with one another. An emergency stop point 125 may be selected whose associated stopping risk is minimized to the greatest possible extent, but that at the same time can still be reached by motor vehicle 105. In further specific embodiments, it can also be taken into account that emergency stop point 125 is to be arrived at as quickly as possible or as conveniently as possible.

Example emergency stop point A is located very close to motor vehicle 105. In order to reach emergency stop point A, motor vehicle 105 has to decelerate strongly, if it is not already traveling very slowly. The deceleration can be regarded as increasing the risk of collision with a different, following traffic participant 115.

Example emergency stop point B is situated behind a curve, so that a traffic participant 115 following motor vehicle 105 may in some circumstances not be able to notice parked motor vehicle 105 until a late time. The risk of a collision at motor vehicle 105, or at other traffic participants 115, caused by motor vehicle 105, can be significant here.

The further example emergency stop point C is located off the street that motor vehicle 105 originally intended to use on the basis of trajectory 120. This emergency stop point C is situated on a cross street on which other traffic participants 115 could likewise be expected. Depending on the expected or determined volume of traffic on the cross street, emergency stop point C may however still have a lower stopping risk than, for example, emergency stop points A or B.

Similar considerations hold for the final example emergency stop point D. However, to reach this stop point, in addition a left turn is required, which can be regarded as increasing the risk. Emergency stop point D could therefore have a greater stopping risk than emergency stop point C.

Figure 2:
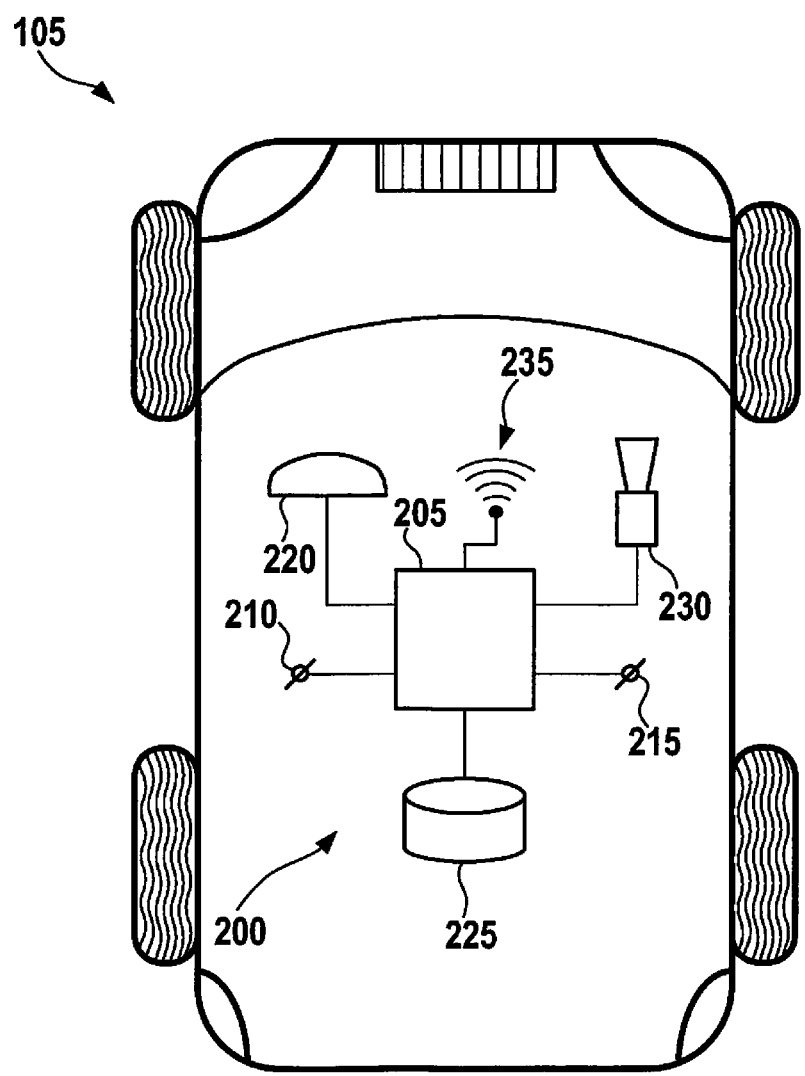
FIG. 2 shows a motor vehicle.

FIG. 2 shows a motor vehicle 105, in particular according to the example of motor vehicle 105 of FIG. 1. A device 200 for determining an emergency stop point 125 is housed on board motor vehicle 105. Device 200 may include a processing device 205 that is connected to a determining device 210 for determining a driving state of motor vehicle 105. Here, determining device 210 is shown as a first interface that can be connected in particular to a control device for controlling motor vehicle 105. Via interface 210, in particular data can be received that indicate a speed, an acceleration, or a technical state of motor vehicle 105. In another specific embodiment, a corresponding sensor can also be connected to first interface 210. Processing device 205 is set up to determine an emergency stop point 125 in the area of motor vehicle 105 on the basis of the driving state or the data received via first interface 210. Here, the determination may take place in such a way that the risk of stopping at the determined emergency stop point 125 does not exceed a predetermined value.

Processing device 205 may be also set up to determine the stopping risk of emergency stop point 125. In a further specific embodiment, processing device 205 is set up to determine a plurality of emergency stop points 125 in the area of motor vehicle 105, to assign each of them stopping risks, and to assess emergency stop points 125 with regard to their stopping risks as well as, if warranted, their distance from motor vehicle 105, or additional criteria. On the basis of this assessment, processing device 205 may select an emergency stop point 125. In addition, processing device 205 can be set up to drive motor vehicle 105 to the determined emergency stop point 125. For this purpose, processing device 205 can in particular be connected to a second interface 215 that can be connected either to a control device for controlling a longitudinal or transverse movement of motor vehicle 105 or to a corresponding actuator for influencing the longitudinal or transverse controlling of motor vehicle 105. In a further specific embodiment, the determined emergency stop point 125 can also be provided to an external control device for motor vehicle 105 via the second interface 215.

For determining and/or evaluating an emergency stop point 125 with regard to a risk of stopping, device 200 can have a positioning device 220, which may be in connection with a storage device 225 for map data, and/or a scanning device 230 for scanning an external area around motor vehicle 105.

Positioning device 220 can in particular include a receiver for signals of a satellite navigation system. Conditions in the environment around motor vehicle 105, in particular the course of the roadway, the type of roadway, the position of traffic nodes such as an intersection or a traffic control device such as a street light, and other standard items of map information, as are also standard for example for navigation using a navigation system on board motor vehicle 105, can also be included in the map data of storage device 225. In a further specific embodiment, additional information regarding an environment surrounding motor vehicle 105, for example traffic volume or an individual further motor vehicle 115, can also be received via a wireless interface 235.

Scanning device 230 can scan an area that in particular is in front of motor vehicle 105 in the direction of travel, in particular optically, by radar, or by lidar. Processing device 205 may be set up to carry out an object recognition on the basis of data recorded using scanning device 230, which recognition in particular distinguishes an area that can be traveled from an area that cannot be traveled, and/or to recognize an object such as another traffic participant 155 or a stationary obstacle on the basis of the data.

Particularly, device 200 may be set up to determine an emergency stop point 125 also with regard to the vehicle's own drivability, or a degree of urgency of the stop. In particular, the driving state data of motor vehicle 105 received via first interface 210 can indicate which types of movements or maneuvers by motor vehicle 105 are still possible, and the maximum range that has to be assumed under the prevailing conditions. The more urgent the stop, the higher a tolerable stopping risk of a reachable emergency stop point 125 can be. However, device 200 may attempt as far as possible to select or drive to the emergency stop point 125, within a current radius of action, that has the lowest stopping risk.

Figure 3:
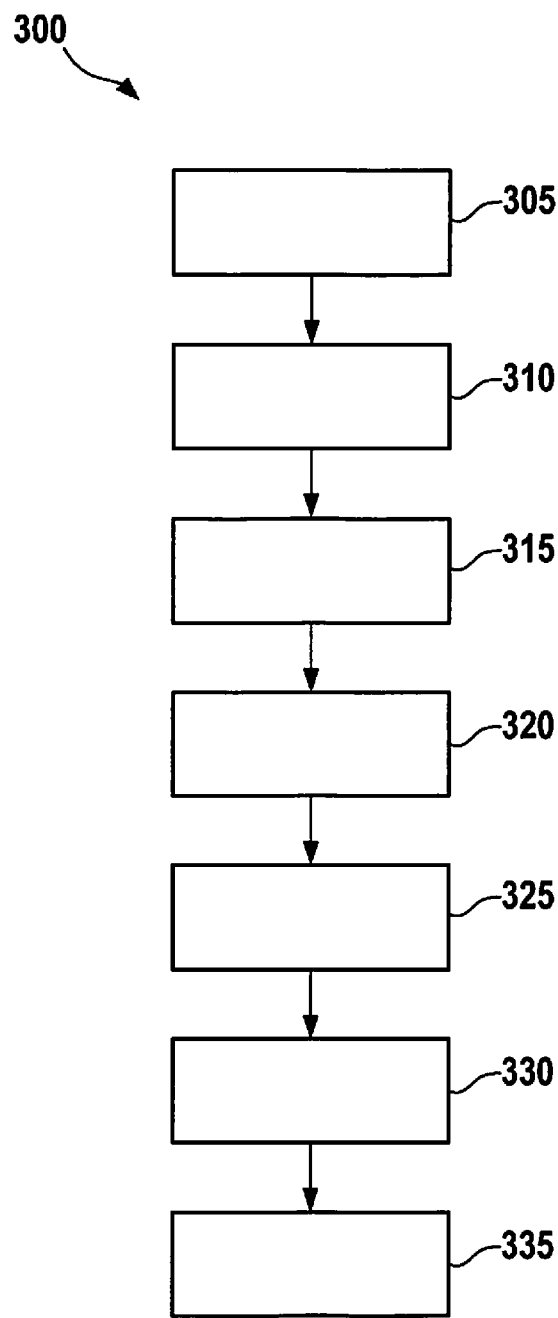
FIG. 3 shows a flow diagram of a method for determining an emergency stop point of a motor vehicle.

FIG. 3 shows a flow diagram of a method 300 for determining an emergency stop point 125 for a motor vehicle 105. Method 300 can be executable at least partly on processing device 205 of device 200 on board motor vehicle 105 of FIG. 2. It is to be noted that the present sequence of steps 305 to 335 is not mandatory. Moreover, a plurality of steps can also be carried out simultaneously, as a person skilled in the art will recognize immediately.

In a step 305, an impending emergency stop of motor vehicle 105 is detected. For example, a technical defect on board motor vehicle 105 can be detected, such as damage to a tire or the engine. A driving state of motor vehicle 105 may be determined in a step 310. The driving state can include in particular a speed or an acceleration of motor vehicle 105. In another specific embodiment, the driving state includes a degree of urgency of the stop from step 305. The urgency can be connected with the magnitude of a risk of damage if motor vehicle 105 is not stopped, or with the size of a remaining radius of action of motor vehicle 105.

In a step 315, surrounding elements are statically determined. For this purpose, in particular map information, for example from memory device 225, can be evaluated. The static information can include in particular information related to the roadway or route.

In a step 320, a surrounding environment of motor vehicle 105 can also be scanned, for example by scanning device 230. In this way, dynamic environmental information of motor vehicle 105 can be determined.

In a step 325, potential stopping points in the area of motor vehicle 105 can be identified. The stopping points can in particular be selected on the basis of the previously determined static and/or dynamic information. In general, the potential stopping points are situated in the direction of travel relative to motor vehicle 105, which further may be along the originally intended trajectory 120 (cf. FIG. 1).

In a step 330, an emergency stop point 125 can be determined on the basis of the potential stop points. For this purpose, on the basis of the statically and/or dynamically determined information a stopping risk can be assigned to each potential stop point, as explained in more detail above. Emergency stop point 125 can then be selected as optimally as possible in particular on the basis of the determined driving state. Here, the risk of stopping at the selected emergency stop point 125 is, as far as possible, the minimal risk among the previously determined potential stopping points. Additional influencing factors in the selection of emergency stop point 125 are also described in more detail above.

The determined emergency stop point 125 can be outputted, for example via second interface 215, or the stopping of motor vehicle 105 at the selected emergency stop point 125 can be carried out in a step 335 of method 300. In a specific embodiment, method 300 can also in part be run through again in order to realize a continuous optimization of the selected emergency stop point 125, in particular with regard to its assigned stopping risk. If for example the selected emergency stop point 125 proves to be riskier than was originally assumed due to dynamic events during the approach of motor vehicle 105, then a new search for a better emergency stop point 125 can be initiated. In addition, if it turns out, for example during the approach to the selected emergency stop point 125, that the radius of action of motor vehicle 105 is larger than was at first assumed, so that a somewhat more distantly located emergency stop point 125 having a lower assigned stopping risk can in fact be reached, motor vehicle 105 can then advantageously be guided to the more favorable emergency stop point 125.

What is claimed is:

1. A method for determining an emergency stop point of a motor vehicle, the method comprising:
   determining a driving state of the motor vehicle including at least one of a speed of the motor vehicle, an acceleration of the motor vehicle, and a detected current state of objects in an environment of the motor vehicle; and
   determining a plurality of emergency stop points that are available in an area of the motor vehicle; wherein
   determining, for each of the determined plurality of emergency stop points, a respective value of a danger of the motor vehicle stopping at the respective emergency stop point, the determination of the respective values of the danger being based on the at least one of the speed of the motor vehicle, the acceleration of the motor vehicle, and the detected current state of the objects in the environment of the motor vehicle;
   selecting one of the determined plurality of emergency stop points based on the determined respective values of the danger, wherein minimization of the danger is a criterion for the selection; and
   outputting the selected emergency stopping point or automatically controlling the motor vehicle to stop at the emergency stopping point.

2. The method of claim 1, wherein the danger of the motor vehicle stopping at the respective emergency stop point includes a risk of additional damage to the motor vehicle or to an occupant.

3. The method of claim 1, wherein the danger of the motor vehicle stopping at the respective emergency stop point includes a risk of damage to another traffic participant.

4. The method of claim 1, wherein the danger of the motor vehicle stopping at the respective emergency stop point is additionally based on environmental data of the emergency stop point from map data.

5. The method of claim 1, wherein the respective values of the danger is based on the speed of the motor vehicle.

6. The method of claim 1, wherein the respective values of the danger is based on the acceleration of the motor vehicle.

7. The method of claim 1, wherein the respective values of the danger is based on the detected current state of the objects in the environment of the motor vehicle.

8. The method of claim 7, further comprising:
   scanning the environment of the motor vehicle to detect the current state of the objects in the environment of the motor vehicle.

9. A device for determining an emergency stop point of a motor vehicle, the device comprising:
   a determining device to determine a driving state of the motor vehicle including at least one of a speed of the motor vehicle, an acceleration of the motor vehicle, and a detected current state of objects in an environment of the motor vehicle; and
   a processing device configured to:
      determine a plurality of emergency stop points that are available in an area of the motor vehicle based;
      determine, for each of the determined plurality of emergency stop points, respective value of a danger of the motor vehicle stopping at the respective emergency stop point, the determination of the respective values of the danger being based on the at least one of the speed of the motor vehicle, the acceleration of the motor vehicle, and the detected current state of the objects in the environment of the motor vehicle;
      select one of the determined plurality of emergency stop points based on the determined respective values of the danger, wherein minimization of the danger is a criterion for the selection; and
      output the selected emergency stopping point or automatically control the motor vehicle to stop at the emergency stopping point.

10. The device of claim 9, wherein the processing device is configured to control a stopping of the motor vehicle at the determined emergency stop point.

* * * * *